Figure 1:
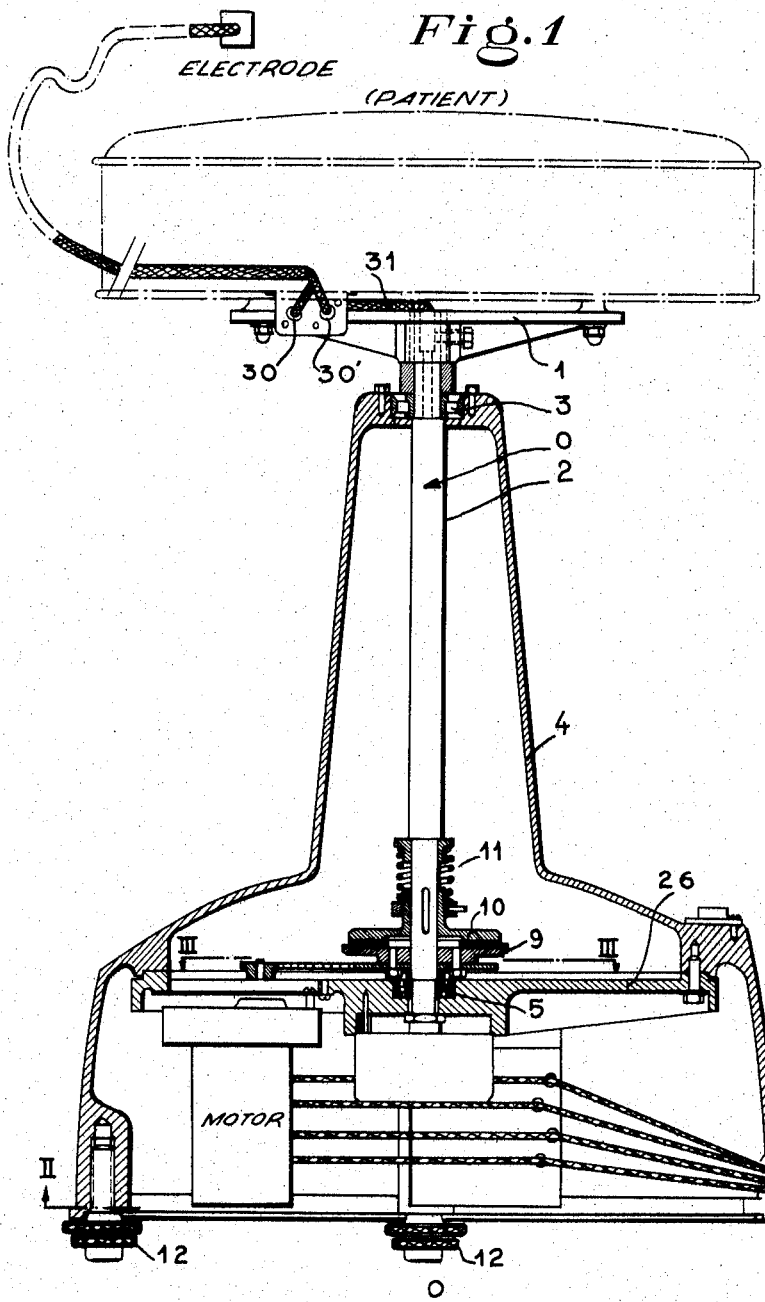

June 28, 1966     J. VULLIET-DURAND     3,258,008
ROTARY SEAT FOR MEDICAL PURPOSES
Filed Dec. 10, 1962     5 Sheets-Sheet 1

INVENTOR
JACQUES VULLIET-DURAND
BY Irwin J. Thompson
ATTORNEY

June 28, 1966  J. VULLIET-DURAND  3,258,008
ROTARY SEAT FOR MEDICAL PURPOSES
Filed Dec. 10, 1962  5 Sheets-Sheet 2

INVENTOR
JACQUES VULLIET-DURAND
BY
ATTORNEY

June 28, 1966  J. VULLIET-DURAND  3,258,008
ROTARY SEAT FOR MEDICAL PURPOSES
Filed Dec. 10, 1962  5 Sheets-Sheet 3

INVENTOR
JACQUES VULLIET-DURAND
BY
ATTORNEY

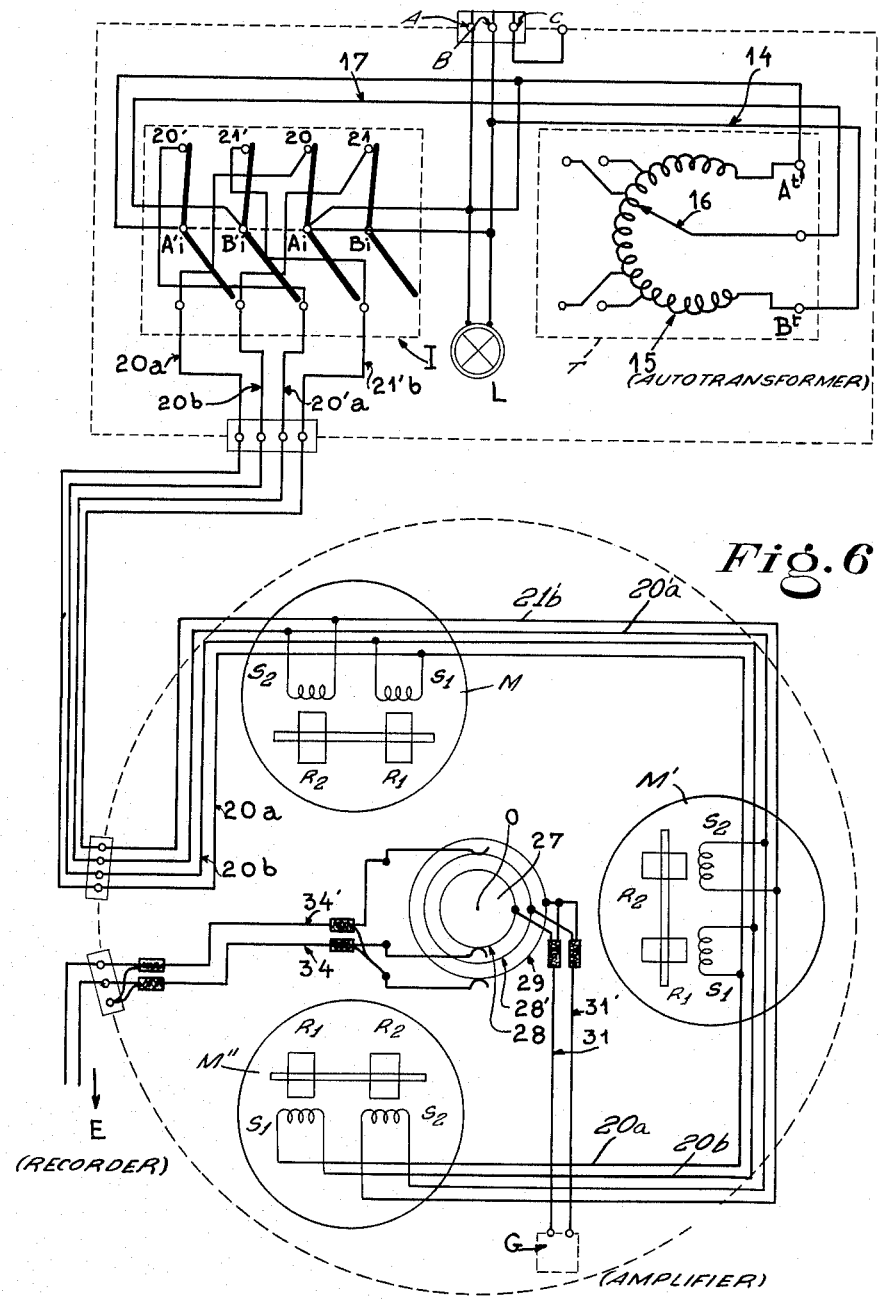

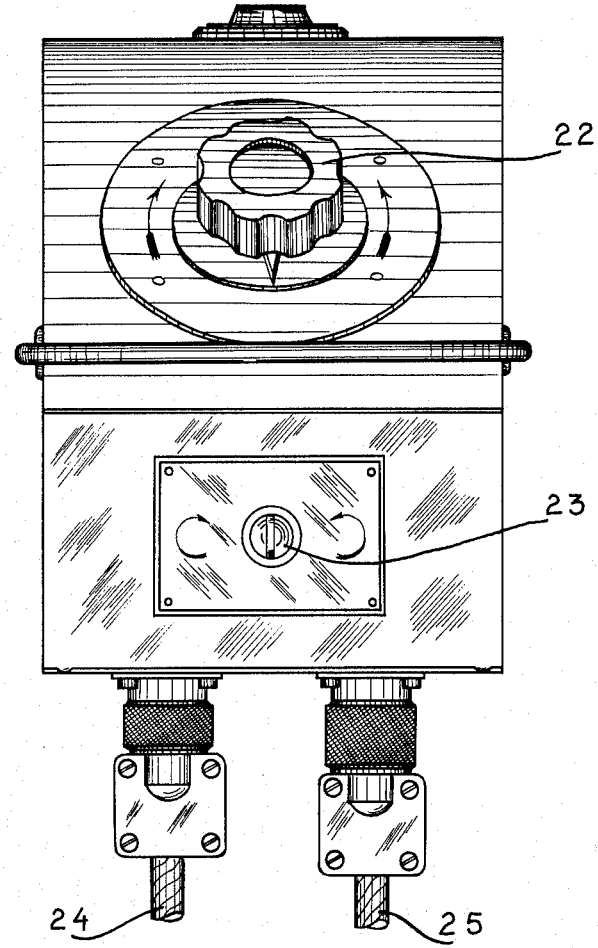

United States Patent Office 3,258,008
Patented June 28, 1966

3,258,008
ROTARY SEAT FOR MEDICAL PURPOSES
Jacques Vulliet-Durand, 91 Promenade des Anglais,
Nice, France
Filed Dec. 10, 1962, Ser. No. 243,364
Claims priority, application France, Dec. 12, 1961,
6,958
1 Claim. (Cl. 128—2.1)

My invention has for its object a rotary seat for medical electrographic purposes which is adapted more particularly for the recording of currents produced by the nerve signals flowing through the patient's ocular nerve system when said patient is subjected to the nystagmus test.

It is a well-known fact that, with a patient sitting on a seat which is caused to revolve around a vertical axis in both directions at a variable speed, electric currents may be collected by electrodes engaging the patient's temples and forehead so as to produce, after a suitable amplification, an electrogram in an electrograph, which electrogram allows detecting through the irregular or anomalous sections of the recorded curve, any deficiency or the like abnormal condition of the patient.

By reason of the special conditions to be satisfied not only for obtaining readily adjustable uniform speeds over a broad range, but chiefly with a view to protecting the currents collected by the electrodes which are extremely weak against any slight disturbance produced through induction or parasitic currents produced by the operation of an electric motor driving the seat, the apparatus resorted to hitherto for nystagmus tests has, among others, the defects of being intricate and expensive and of being of necessity permanently mounted at the practitioner's as a consequence of its weight and bulk.

The seat according to the invention satisfies, in contradistinction, all the conditions of a perfect operation and of a faithful recording of all the modulations of the current collected by the electrodes, without any possibility of an electric or magnetic disturbance while being much simpler, less expensive and of a reduced weight which allows its transportation if required to the patient's home.

According to my invention, the rotary seat is electrically controlled by at least one driving unit including two separate asynchronous motors, the rotor of one of which is fed directly by line voltage and is adapted to revolve in one direction while the rotor of the other motor is fed with an adjustable fraction of said voltage through the agency of an autotransformer and is adapted to revolve in a direction opposed to the direction of rotation of the rotor of the first motor, the two rotors being however keyed to a single common shaft, which arrangement is rendered possible by the sliding obtained in asynchronous motors.

This association allows modifying at will the speed of the driving shaft between full speed and very low speed, the rotor of the second motor forming a brake for the rotor of the first motor.

Since an asynchronous motor loses a very large fraction of its power when it is caused to revolve at a speed which is substantially lower than that corresponding to normal running conditions, I prefer not to resort to a single driving unit which would have to be too powerful and I replace said unit by a plurality of units operating under a low power, fed in parallel and mechanically coupled with the shaft driving the seat, for instance through the agency of pinions controlled by said units and engaging a common chain driving said shaft. For instance, I may resort to units of a power of 30 to 40 watts, the rotors of which revolve normally at the rate of 3,600 r.p.m. and associated with a speed reducer so as to make the speed of the shaft outside the unit casing drop to about 20 r.p.m.

Of course, the whole arrangement is associated with means for reversing the direction of the feed currents so as to reverse the direction of rotation of the seat.

In order to allow stopping the seat at any desired moment, while the motors continue rotating, or if it is desired to make the seat revolve by hand, the driving means are operatively connected with the actual seat-controlling shaft through a friction coupling.

Figure 2:
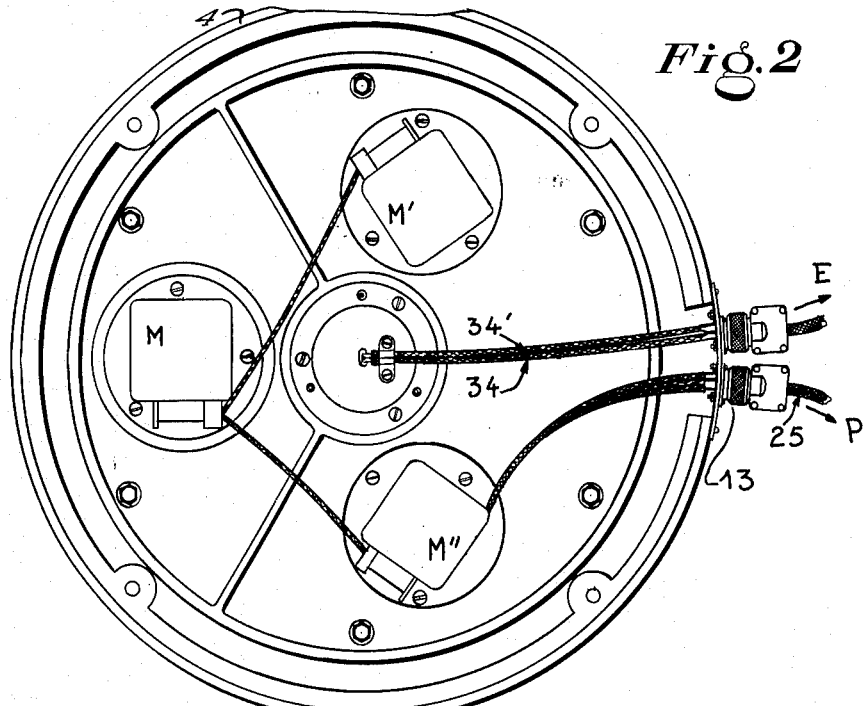
Figure 3:
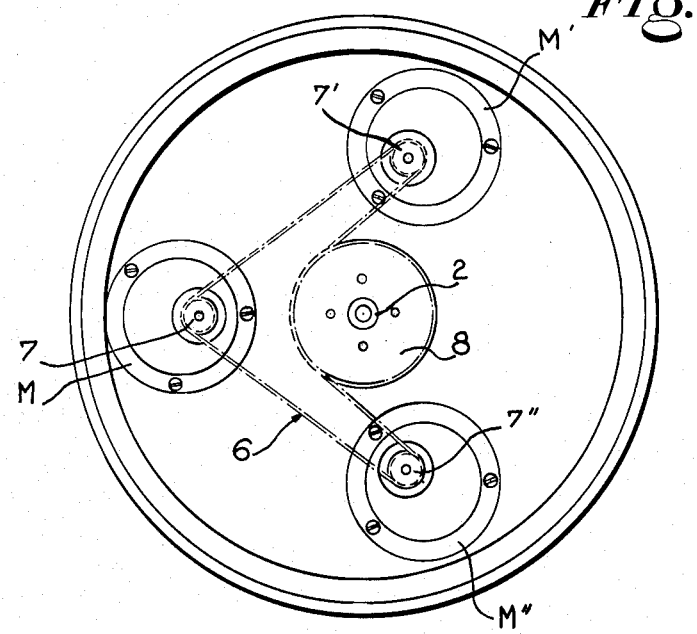
Figure 4:
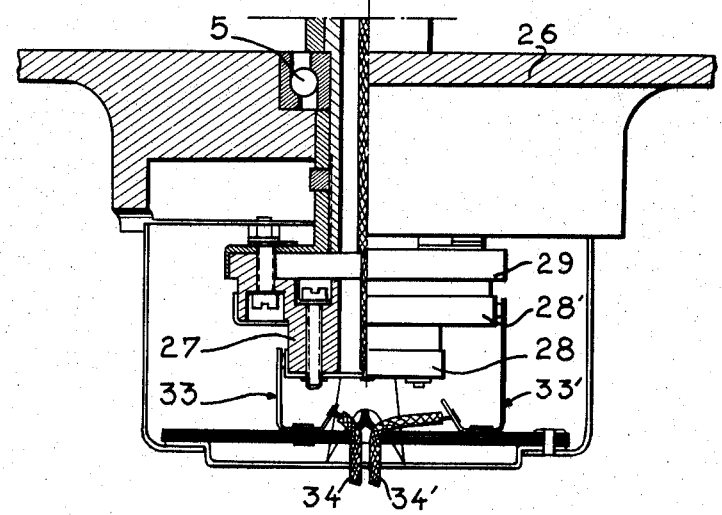
Figure 5:
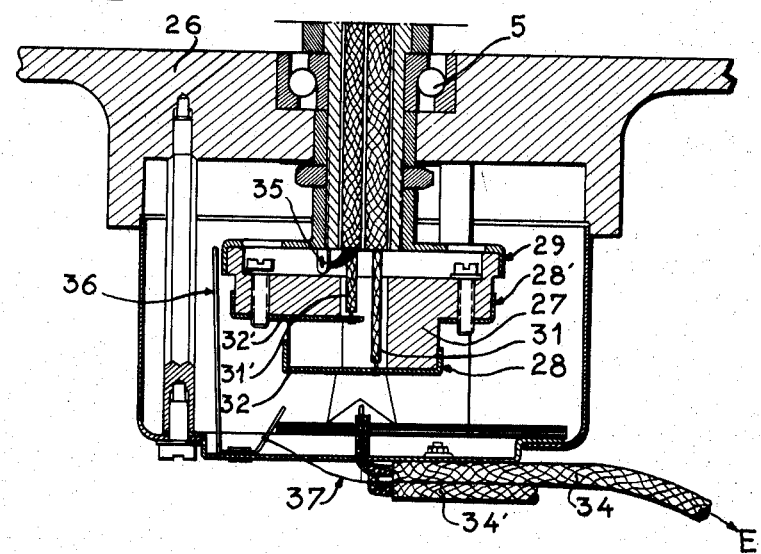

Further features relating to the propagation of the currents arising in the patient's nerves and collected by the electrodes will appear in the reading of the following description of a preferred embodiment given by way of example, reference being made to the accompanying drawings, wherein:

FIG. 1 is a vertical axial cross-section of the seat including its driving means, FIG. 2 shows a seat as seen from below in the direction of the arrows II—II of FIG. 1, FIG. 3 is a horizontal cross-section through line III—III of FIG. 1, FIGS. 4 and 5 are partly sectional views in two angularly shifted vertical planes, showing the system of sliders running on conductive rings for transmitting the currents collected on the patient's body, certain parts of the arrangement being shown in side view in FIG. 4, FIG. 6 is a wiring diagram and FIG. 7 is a plan view of the control desk.

As illustrated, the seat 1 is fitted on a pivot or upright 2 having a vertical axis shown at 00, said pivot being revolvably held in the bearing 3 fitted in the frame 4 while its lower end rests in a roller step bearing 5.

Three driving units M, M', M'' housed inside the frame and distributed uniformly around the central axis 00, control through a common chain 6 (FIG. 3) engaging the pinions 7, 7', 7'' driven by said units and the central toothed wheel 8, the rotation of the plate 9 coaxial with the pivot 2 and rigid with said toothed wheel 8. The pivot 2 is frictionally coupled with said plate 9 through a disc 10 keyed by means of an elongated key to the pivot 2 and urged under a suitably adjusted pressure against the plate 9 by the spring 11. The frame 4 of the instrument rests on three screws 12 providing for the adjustment as to level with a view to ensuring an accurate verticality of the rotary axis 00, while the lower end of said frame is provided with a socket 13 adapted to be engaged by a current-feeding plug connected through a cable with the control desk D, said cable including four leads and the plug and socket constituting four contact systems feeding in parallel the driving units as illustrated in the wiring diagram of FIG. 6.

In said wiring diagram, O designates the central vertical axis, M, M' and M'' the three driving units, T the autotransformer through which speed adjustment is performed, a four-pole reversing switch and L a signal lamp.

Each motor M, M' and M'' includes two rotors which are wound in a manner such that when energized simultaneously, they revolve in opposite directions. The feeding of said two rotors requires therefore the use of four leads.

The terminals A and B of the leads are connected respectively with the terminals A*t* and B*t* of the auto-transformer and, on the other hand, the terminal A is connected directly with the central terminals A*i* and A'*i* of the reversing switch, while the other terminal B is connected directly with the terminal B*i* of the reversing switch and indirectly with the terminal B'*i* of said reversing switch, said indirect connection being performed through the agency of the lead 14, the terminal B*t* of the auto-transformer, the section 15 of the auto-transformer winding, the slider 16 cooperating with the said autotransformer winding and the lead 17 connected with the terminal B′i.

Assuming the reversing switch has been caused to rock towards the left-hand side into the position drawn in solid lines, it is apparent that one of the rotors is fed by the following circuit: terminal A, terminal Ai, contact piece 20, lead 20a, the rotor, return lead 20b, contact piece 21, switch terminal Bi, terminal B of the leads.

Said rotor is thus energized with the full voltage of the leads. The circuit of the other rotor associated with the same motor is as follows: terminal A, switch terminal A′i, contact piece 20′, lead 20′a, return 21′b, contact piece 21′, switch terminal B′i, lead 17, slider 16, section 15 of the autotransformer winding, terminal Bt of the the mains, which fraction is adjustable at will. The second rotor is thus fed through a fraction of the voltage of the mains, which fraction is adjustable at will. The second rotor opposes thus with a reduced power the rotation of the first rotor and forms an actual brake the power of which is adjustable through operation of the autotransformer slider.

Obviously, if the reversing switch is rocked towards the right-hand side of FIG. 6, the feed will be reversed for both rotors and the rotor first described above instead of being the driving rotor will form the braking rotor while the braking rotor last described above forms now the driving rotor, the direction of rotation of the seat being reversed.

FIG. 7 is a plan view of the control desk in the pedestal of which the auto-transformer is enclosed of which the slider-controlling knob is shown at 22 and the knob controlling the reversing switch is shown at 23, said switch and auto-transformer being fed by the armored cable 24 including two leads and connected with the leads, while the cable 25 including four leads connects the driving means for the revolving seat through the above-referred to plug and socket arrangement 13. The third terminal C of the leads connected with the general armoring of the current-feeding wires is grounded through the desk body.

Since the motors have no commutator and are armoured, and the whole arrangement starting from the terminals connected with the leads is also armoured, there is no risk of any parasitic current being produced.

The connection between the electrodes applied to the patient's head and the recording apparatus or electrograph are provided as follows: the pivot or upright 2 carrying the seat is bored axially throughout its height, and it extends under a removable flange 26 of the frame 4 which carries the roller step bearing 5 for the pivot, said extension of the pivot 2 rigidly carrying an insulating sleeve 27 (FIGS. 4 and 5) forming outwardly three annular steps provided each along its periphery with a metal contact ring as shown respectively at 28, 28′ and 29.

The two currents collected on the two temples of the patient are fed separately by two armored leads, first into a preliminary amplifier G, carried by the rotary seat or by the patient himself, whence the amplified current reaches the corresponding terminals 30 and 30′ on the actual seat (FIG. 1), said last-mentioned terminals being connected with the armored leads 31, 31′ extending inside the axial channel formed in the pivot 2 so as to be finally connected respectively with the metal ring 28 and with the metal ring 28′ through the corresponding blades 32 and 32′ (FIG. 5). The brushes 33 and 33′ (FIG. 4) rub over said rings 28 and 28′ and connect them with the leads 34 and 34′ which are also armored and are connected with the recording means E. As to the electrode carried by the patient's forehead, it is grounded since it is connected through the armoring cover of the successive leads described hereinabove and the eye 35 (FIG. 5) with the third metal ring 29 which is connected in its turn through the brush 36 rubbing on it and the tongue 37 with the armoring sheath enclosing the leads 34 and 34′. The armoring sheaths of last-mentioned leads may in fact be welded directly to the brush 36.

A particular feature of my invention consists in making the contact rings 28, 28′ and 29 out of a precious metal such as gold or a gold alloy or else, in coating the rings with such a precious metal. Before coating the ring with a precious metal, said rings are trued and polished. This ensures a smooth and perfectly continuous contacting, which excludes any possibility of a sudden change in the ohmic resistance, and ensures faithfulness in the recording of the collected undulating currents.

What I claim is:

Apparatus for performing nystagmus tests, comprising a seat for supporting a patient in a seated position, a vertically disposed hollow pivot member secured to the seat, means supporting the pivot member for rotation about a vertical axis, electrodes attachable to the head of a patient seated on the seat, conductors for transmitting electrical impulses from said electrodes downwardly through the hollow vertical pivot member, a metal collector ring coaxial with said axis, a brush in electrical contact with said ring, one of said brush and ring being fixed to and rotatable with said pivot member and the other of said brush and ring being stationary, said rotatable one of said brush and ring being in electrical circuit with said conductors, means for recording said electrical impulses, means for transmitting electrical impulses from said fixed one of said brush and ring to said recording means, and motor means for rotating the seat.

References Cited by the Examiner

UNITED STATES PATENTS

| 1,897,990 | 2/1933 | Smyser | 318—48 X |
| 2,707,465 | 5/1955 | Nemeth | 128—46 |
| 2,805,375 | 9/1957 | Morgan | 318—48 |

OTHER REFERENCES

Glasser: Medical Physics, pages 576 and 578 published 1950 by Year Book Publishers PH505G55.

Wyss: "Adequate Shape . . . " pages 42–51 of American Journal of Physiology, September 1937.

RICHARD A. GAUDET, *Primary Examiner.*

LOUIS R. PRINCE, *Examiner.*

SIMON BRODER, *Assistant Examiner.*